(12) United States Patent
Brown et al.

(10) Patent No.: US 6,904,722 B2
(45) Date of Patent: Jun. 14, 2005

(54) ELONGATED TRUSS BOOM STRUCTURES FOR SPACE APPLICATIONS

(75) Inventors: Michael A. Brown, Columbia, MD (US); Christopher J. Butkiewicz, Horicon, WI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 82 days.

(21) Appl. No.: 09/788,407

(22) Filed: Feb. 21, 2001

(65) Prior Publication Data
US 2002/0112417 A1 Aug. 22, 2002

(51) Int. Cl.$^7$ .................................. B66C 13/12
(52) U.S. Cl. ...................... 52/121; 52/108; 52/645; 52/653.2
(58) Field of Search .................. 52/2.18, 2.11, 52/108, 641, 645, 653.1, 653.2, 121, 114

(56) References Cited

U.S. PATENT DOCUMENTS

| | | | | |
|---|---|---|---|---|
| 2,583,072 A | * | 1/1952 | Wilson .......................... 52/121 |
| 2,804,949 A | * | 9/1957 | Woolslayer et al. ........... 52/111 |
| 3,252,173 A | | 5/1966 | Robinsky |
| 3,258,800 A | | 7/1966 | Robinsky |
| 3,314,200 A | * | 4/1967 | Schuster ...................... 52/108 |
| 3,385,397 A | | 5/1968 | Robinsky ..................... 182/41 |
| 3,494,593 A | * | 2/1970 | Blagg ......................... 254/336 |
| 3,528,543 A | | 9/1970 | Robinsky |
| 3,564,789 A | * | 2/1971 | Vyvyan et al. ............... 52/108 |
| 3,672,104 A | | 6/1972 | Luckey |
| 3,751,863 A | * | 8/1973 | Lyons ......................... 52/111 |
| 3,811,633 A | * | 5/1974 | Cummings et al. ....... 242/54 A |
| 3,862,528 A | | 1/1975 | Meissinger |
| 4,202,547 A | * | 5/1980 | Mueller ...................... 473/161 |
| 4,383,616 A | * | 5/1983 | Sterner et al. .............. 212/299 |
| 4,475,323 A | * | 10/1984 | Schwartzberg et al. ....... 52/111 |
| 4,480,415 A | * | 11/1984 | Truss ......................... 52/108 |
| 4,587,777 A | * | 5/1986 | Vasques et al. ............... 52/108 |
| 4,637,192 A | | 1/1987 | Brown |
| 4,657,469 A | * | 4/1987 | Beierle et al. ............... 414/607 |
| 4,725,025 A | * | 2/1988 | Binge et al. ................. 244/173 |
| 4,763,836 A | * | 8/1988 | Lyle et al. .................... 239/69 |
| 4,854,711 A | * | 8/1989 | Hagan .......................... 366/46 |
| 4,864,784 A | * | 9/1989 | Binge et al. .................. 52/108 |
| 4,969,301 A | * | 11/1990 | Warden ........................ 52/108 |
| 5,003,736 A | | 4/1991 | Okazaki et al. |
| 5,094,595 A | * | 3/1992 | Labrador ..................... 417/332 |
| 5,163,262 A | | 11/1992 | Adams |
| 5,267,424 A | | 12/1993 | Douglas |
| 5,549,347 A | * | 8/1996 | Anderson ...................... 296/98 |
| 5,586,925 A | * | 12/1996 | DiNorcia et al. .............. 451/35 |
| 5,822,945 A | * | 10/1998 | Muller ......................... 52/646 |
| 5,909,197 A | | 6/1999 | Heinemann et al. |
| 5,989,127 A | * | 11/1999 | Kitchen et al. ............... 472/44 |
| 6,076,770 A | | 6/2000 | Nygren et al. |

FOREIGN PATENT DOCUMENTS

| GB | 2074981 | * 11/1981 | .................. 52/121 |
|---|---|---|---|
| JP | 39350 | * 4/1981 | .................. 52/121 |

* cited by examiner

Primary Examiner—Phi Dieu Tran A
(74) Attorney, Agent, or Firm—John J. Karasek; Sally A. Ferrett

(57) ABSTRACT

An elongated truss boom structure is adapted to be flattened and coiled to a stowed configuration. The truss boom includes longerons, battens, and diagonals. A fixed ladder shaped structure is formed by a plurality of fixedly coupled battens which interconnect two adjacent longerons. The truss boom is flattened for stowage by arranging all of the longerons coplanar to the plane of the fixed ladder shaped structure. The longerons preferably have a corrugated cross section. For stowage the longeron is heated and compressed into a ribbon shaped cross section, and upon deployment the longeron is heated to restore its corrugated cross section. A mechanical assembly machine includes a drum, a stowed flattened truss boom rolled into a coil around the drum, a device for unrolling the coil, an actuating and locking mechanism, and a control arm which connects the actuating and locking mechanism to the drum.

12 Claims, 18 Drawing Sheets

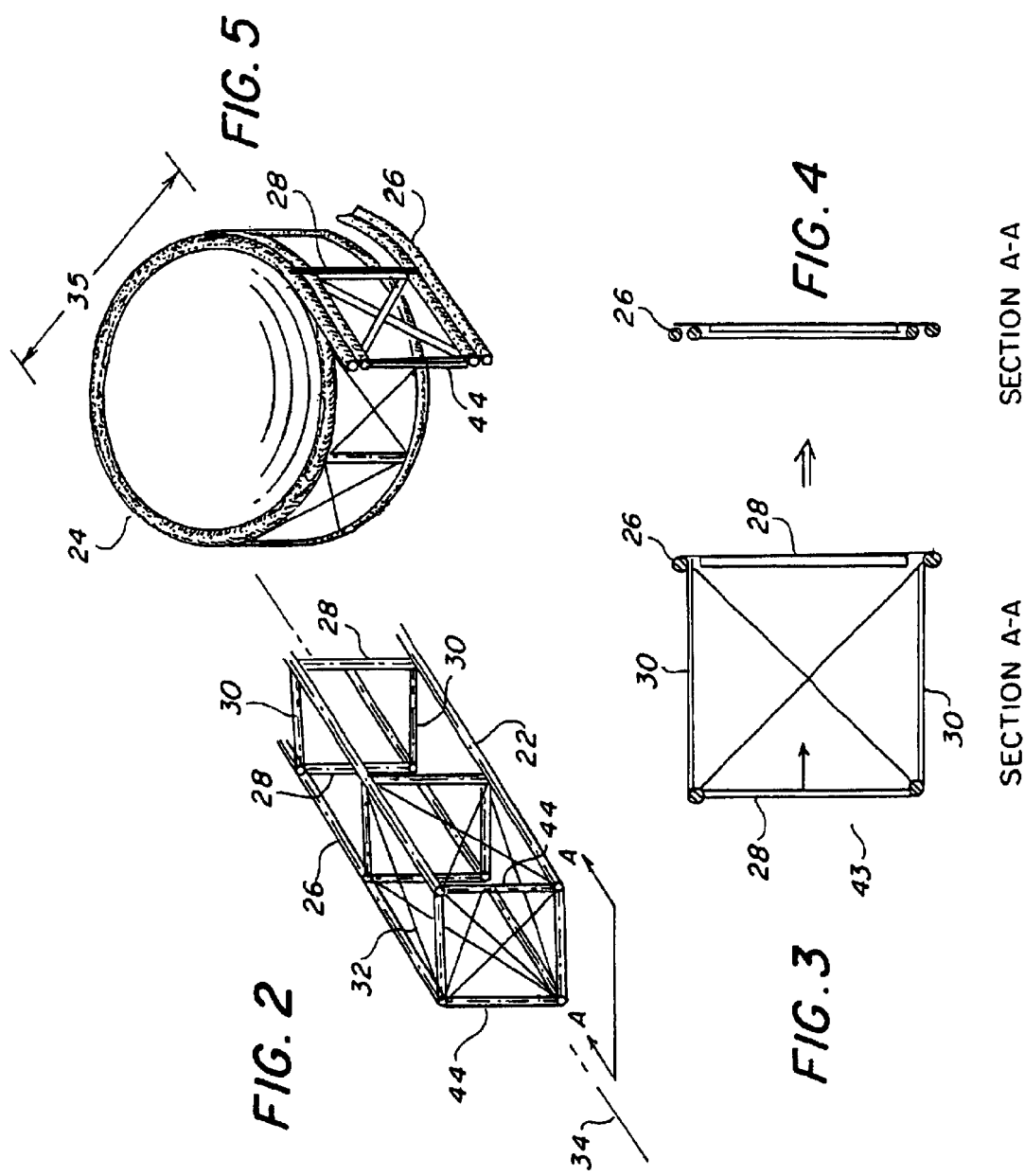

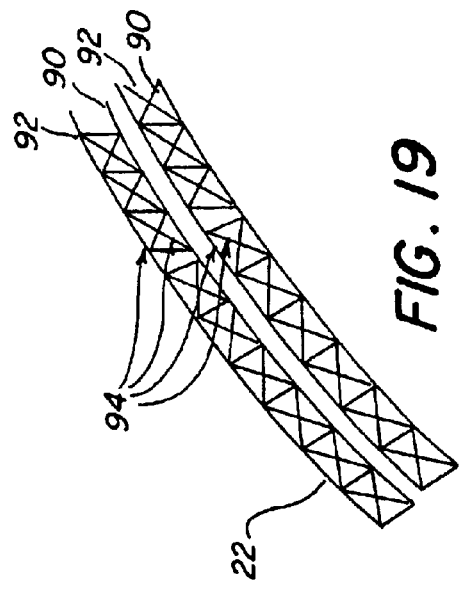
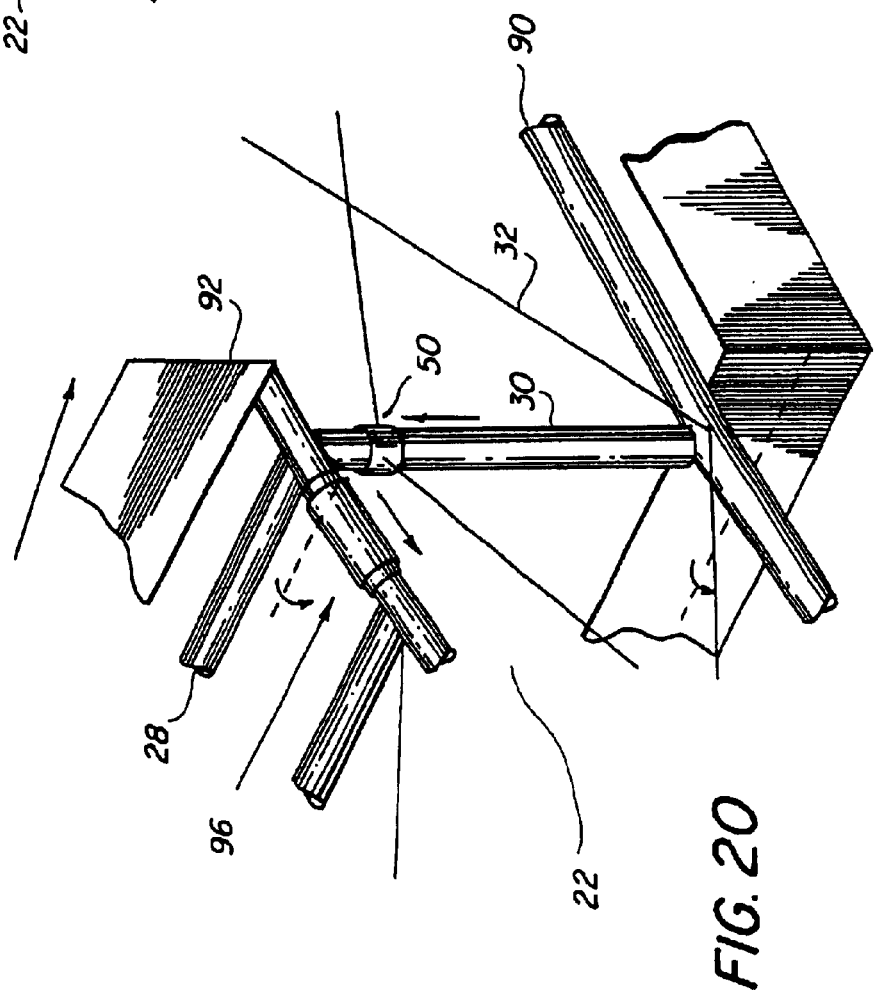

SECTION A-A

ELONGATED TRUSS BOOM STRUCTURES FOR SPACE APPLICATIONS

FIELD OF THE INVENTION

This invention relates in general to an elongated truss boom structure adapted to be flattened and coiled to a stowed configuration. More specifically, the invention is related to an elongated truss boom structure including longerons, fixed batten, moveable battens and diagonals that enable the construction of large scale spacecraft interferometric systems and antennas on a single vehicle.

BACKGROUND OF THE INVENTION

This invention relates generally to truss boom structures, and more specifically, to long lightweight deployable truss boom structures. Many space missions require the use of long lightweight deployable truss booms. Truss booms have been used extensively in spacecraft as masts to support and accurately position a feed-horn for a large antenna or to deploy and tension the blankets of a solar array. Common boom applications are for deployment and support from spacecraft of items such as scientific instruments, cameras, solar arrays, antennas, sun shades, optical components, magnetometers and "gravity gradient" masses which stabilize satellites in their attitude toward earth. Recent missions carrying truss booms have been the Mars Pathfinder, Cassini and the Lunar Prospector. Truss booms have been flown in lengths as long as the 60 meter boom which was utilized for the Shuttle Radar Topographic Mission of September, 1999.

A pervasive problem with conventional truss booms is that the length of their deployed or elongated configuration makes the truss boom almost impossible to transport in that configuration. For land-based applications the solution is quite simple. The truss boom is provided as a group of individual parts which are joined together at the site. However, for space-borne equipment this solution is not appropriate. To overcome this problem, numerous arrangements have been proposed for storage and transport of truss booms in a retracted configuration, which occupies a relatively small volume and has a much reduced axial length. Stowed truss booms are released from their retracted configuration and caused to extend to their deployed configuration. This available change in bulk volume and axial length enables a long truss boom to be carried in a small cannister, and to be deployed only when needed.

There are two primary types of conventional stowable truss booms: (1) helically coilable booms having continuous longerons such as the coilable boom manufactured by AEC-Able Engineering Co., Inc., Goleta, Calif. and (2) articulated truss booms having segmented longerons such as the ADAM articulated mast manufactured by AEC-Able Engineering Co., Inc., Goleta, Calif. Helically coilable truss booms are composed of longerons which are extremely thin and flexible, and they are stowed by helically coiling the truss boom inside a storage cannister. Segmented truss booms are composed of segmented longerons which are discontinuous at each intersection between the longerons and connecting battens. They are stowed by stacking the segmented longerons and battens within a storage cannister. Both types of conventional truss booms stow for launch by coiling or folding inside a storage canister which has a length of about 2.3% of the deployed length of the truss boom. Thus, a sixty meter truss boom would require a storage cannister which is 1.4 meters long.

Present space missions require longer truss booms, however, the maximum length of presently available truss booms is limited to about sixty meters. The limitations of the maximum length of truss booms include their required stowage area and their weight, both attributable in part to the requirement for a storage canister. As coilable truss booms are helically wound inside of a storage cannister for stowage and transport, coilable truss booms generally utilize thin longerons of low modulus material resulting in low boom stiffness and a long undesirably flexible deployed truss boom. As articulated truss booms are transported as segments of a manageable length for stowage and transport, deployment of the truss boom requires the segments to be connected together at connection joints, and slippage at these connection joints is a drawback which this type of boom may experience.

FIG. 1 illustrates a conventional truss boom 10 structure composed of load carrying axial longerons 12 that are stiffened by stabilized by battens 14 and diagonals 16. The truss boom 10 is utilized to support a feed horn of an antenna 18. The truss boom 10 is stowed inside of a storage canister 20. As shown in FIG. 1, another major limitation with conventional stowable truss booms 10 is that there is no room within the storage canister 20 for apparatus such as instrumentation or control devices. Such apparatus, for example an antenna 18, must be attached to the leading end of the truss boom 10 and stowed exterior to the storage cannister 20.

The object of the present invention is to provide a truss boom which is much longer in length upon deployment than presently available truss booms. The truss boom must be capable of compact stowage within the confines of a spacecraft, and it must be deployable in space.

SUMMARY OF THE INVENTION

The present invention provides an elongated truss boom structure adapted to be flattened and coiled to a stowed configuration. In a preferred embodiment, the elongated truss boom includes a plurality of longerons arranged parallel to and equidistant from a longitudinal axis of the truss boom forming a polygonal cross section normal to the longitudinal axis, a plurality of fixed battens, and a plurality of moveable battens. The fixed battens and the moveable battens are coupled to the longerons to form a plurality of polygonal frame members which are located in a series of planes normal to the longitudinal axis, and wherein the fixed battens interconnect the longerons to form two opposing rigid ladder shaped structures which are moveably connected by movable battens. The moveable battens are fully extended and the ladder shaped structures are separated when the truss boom is extended, and the moveable battens are closed and the ladder shaped structures are together such that the longerons are substantially coplanar when the truss boom is stowed. A plurality of diagonals are also preferably provided to interconnect adjacent polygonal frame members.

In another preferred embodiment of the invention, the longerons have a corrugated cross section. For stowage the longeron is heated and compressed into a flat ribbon shaped cross section, and upon deployment the longeron is heated to restore its corrugated cross section.

In another embodiment of the invention, the truss boom is self actuating, and a self actuation device biases the moveably coupled battens and the truss boom in an expanded position.

In another embodiment of the invention, the truss boom is mechanically actuated, a mechanically actuated locking device releases the truss boom for stowage and locks the deployed truss boom.

The present invention also provides mechanical assembly machine for deploying the truss boom which includes a drum; a stowed flattened truss boom rolled into a coil around the drum; a device for unrolling the coil; an actuating and locking mechanism which holds a leading edge of the truss boom and includes an upper plate, a lower plate, diagonal tensioners, and oscillating longeron clamps; and a control arm which connects the actuating and locking mechanism to the drum. The actuating and locking mechanism deploys a mechanically actuated truss boom by feeding out the leading edge and then mechanically un-flattening and locking the truss boom while the truss boom is unrolled.

The present invention also provides a method for stowing an elongated truss boom including compressing the truss boom laterally into an elongated flat structure; rolling the flat structure into a coil, and unrolling and expanding the truss boom into an elongated three dimensional structure.

Other advantages and features of the invention will become apparent from the following detailed description of the preferred embodiments and the accompanying drawings.

BRIEF DESCRIPTION OF THE DRAWINGS

The invention will now be described with reference to certain preferred embodiments thereof and the accompanying drawings, wherein:

FIG. 2 is a perspective view of a deployed truss boom in accordance with the present invention;

FIG. 3 is a cross section of a deployed truss boom in accordance with the present invention;

FIG. 4 is a cross section of truss boom which has been flattened in preparation for stowage in accordance with the present invention;

FIG. 5 is a perspective view of a stowed coiled truss boom in accordance with the present invention;

FIG. 19 is a perspective view of an expansion joint located at the outer longerons of a ring shaped truss boom;

FIG. 20 is a perspective view of a telescoping expansion joint;

DETAILED DESCRIPTION OF THE PREFERRED EMBODIMENTS

Figure 1:
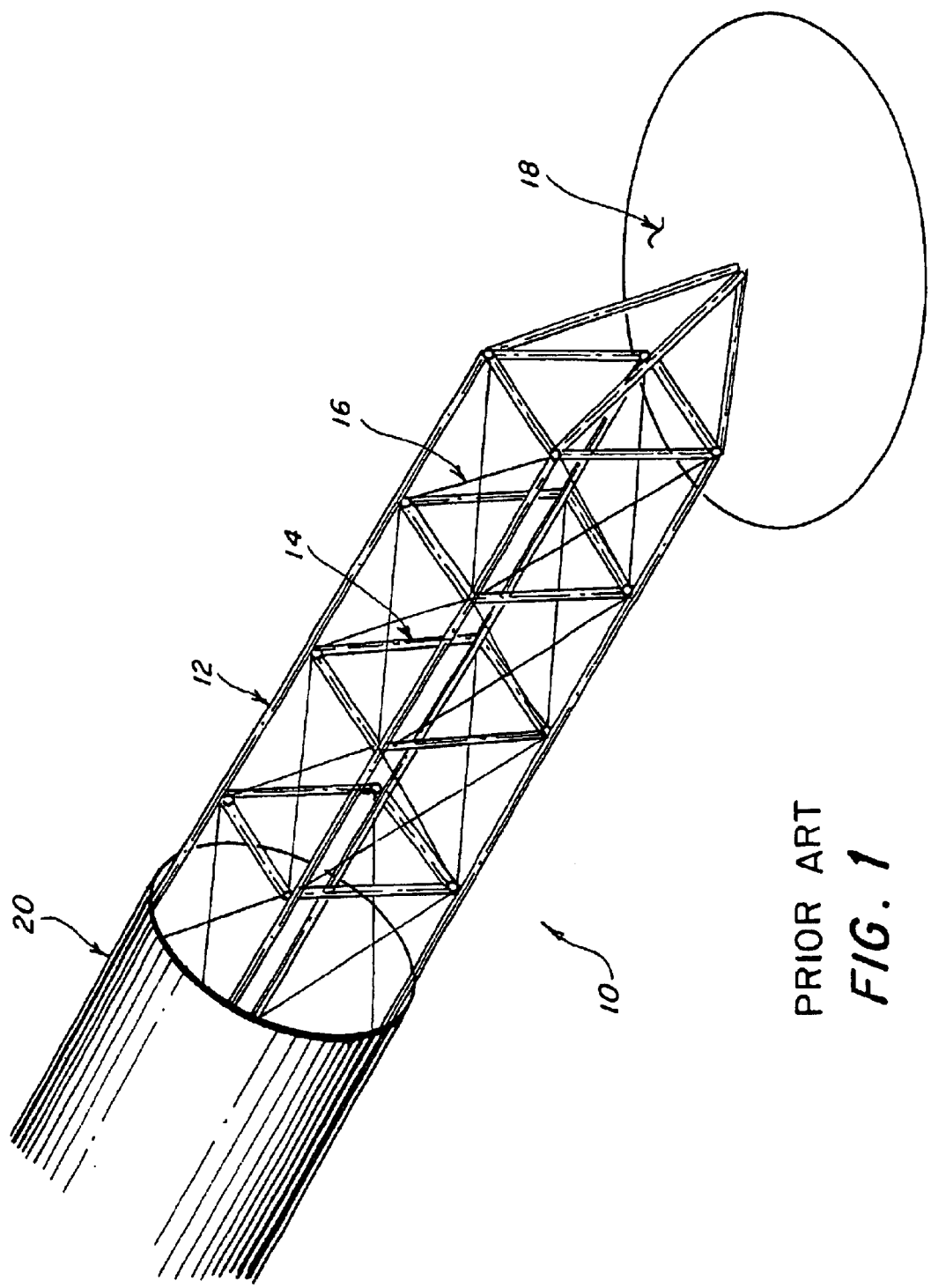
FIG. 1 is a perspective view of a conventional truss boom.

The present invention provides a truss boom 22 which may be compactly stowed and deployed in space. As shown in FIG. 2, the truss boom 22 includes longerons 26, fixed battens 28, moveable battens 30, and diagonals 32. As shown in FIG. 5, the truss boom 22 is flattened and rolled onto a coil 24 for storage.

The longerons 26 run along the longitudinal axis 34 of the truss boom 22 as shown in FIG. 2. The longerons 26 are preferably constructed of a material which is structurally stiff, lightweight, and which is capable of being flexed into the large coil 24. In accordance with a preferred embodiment of the invention, the longerons 26, fixed battens 28 and moveable battons 30 are composed of a composite graphite/epoxy material. However, other materials having the above-described properties may be utilized.

Figure 6:
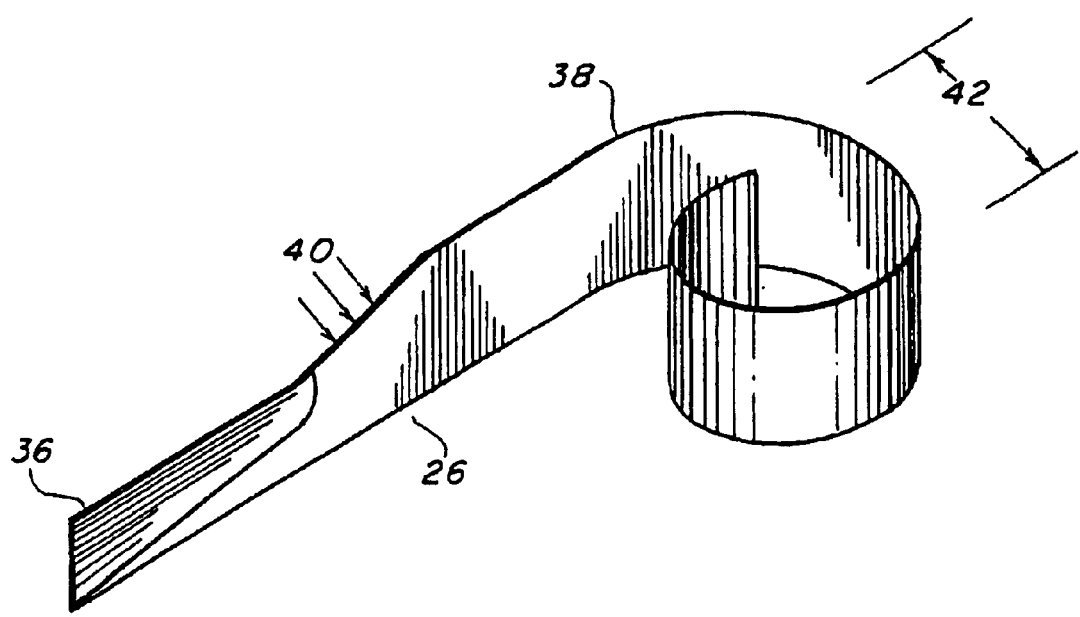
FIG. 6 is a perspective view of a longeron having an "L" shaped cross section which may be flattened into a ribbon for stowage.

In the embodiment illustrated in FIG. 2, the longerons 26 are preferably formed in the shape of a solid rod having a rounded cross section. Solid rods have two drawbacks, however, which limit the maximum length of the truss boom 22. Their buckling strength is limited, and they require a large minimum coiled diameter 35 during stowage. In accordance with another preferred embodiment shown in FIG. 6, the longerons 26 have a corrugated cross section 36, including at least one crease or fold, which in the illustrated embodiment preferably forms an "L" shaped. The composite longeron material is manufactured in the desired corrugated cross section, and then it is heated and mechanically crushed into a flat ribbon shaped cross section 38 for stowage. Upon deployment, the longeron 26 is returned to its original shape by applying heat 40. This configuration overcomes the draw backs of solid rod shaped longerons 26. A longeron 26 having a corrugated cross section 36, provides a considerably larger buckling strength and a considerably smaller minimum coiled diameter 42, than those of a rod shaped longeron 26 having the same mass per unit length.

As shown in FIG. 3, two parallel fixed battens 28 are joined with two parallel moveable battens 30 form a polygonal frame member 43, which is preferably square shaped. The frame members 43 are spaced at predetermined intervals along the longitudinal axis 34. The fixed battens 28 are oriented perpendicular to the longitudinal axis 34, and they interconnect the longerons 26 to form two opposing rigid ladder shaped structures 44 which are moveably connected by movable battens 30. When the truss boom 22 is deployed, the moveable battens 30 are fully extended and perpendicular to the longerons 26. However, when the truss boom 22 is flattened for stowage, the moveable battens 30 are closed and all longerons 26a and 26b are coplanar as shown in FIG. 4.

In accordance with the present invention, the truss boom 22 may be either mechanically actuated or self actuated. Self actuated truss booms 22 are held in the expanded position by fully extended moveable battens 30 having integral springs and self actuation mechanisms which are biased in the expanded position, and a force must be applied to hold the truss boom 22 flat during stowage. Externally actuated truss booms 22 remain flat until they are mechanically expanded and then locked into the expanded cross section. Externally actuated truss booms 22 become more advantageous as their length increases, because the cumulative weight of springs and self actuation mechanisms eventually exceeds the weight of a mechanical assembly machine.

Figure 8:
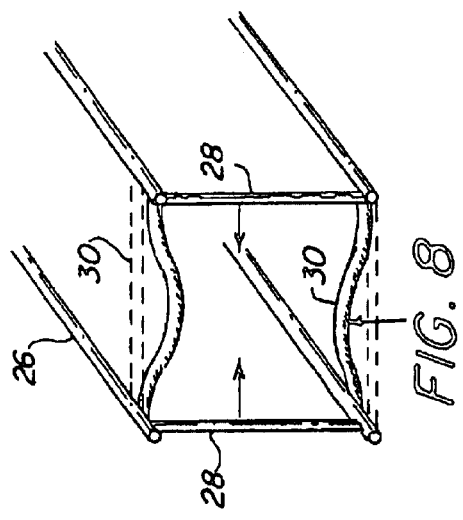
FIG. 8 is a perspective view of a truss boom illustrating the operation of flexible moveable battens.
Figure 7:
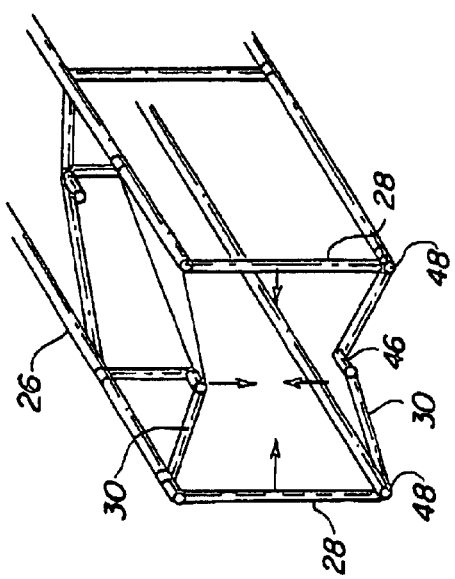
FIG. 7 is a perspective view of a truss boom illustrating the operation of center hinged moveable battens.

FIGS. 7 and 8 illustrate self actuating truss booms. FIG. 7 illustrates an embodiment of the invention in which the truss boom 22 is compressed by folding moveable battens 30 having center hinges 46. Springs 48, which are located at the center hinges 46, are biased to hold the truss boom 22 in an expanded square cross section. FIG. 8 illustrates another embodiment of the invention wherein flexible moveable battens 30 are folded flat when the truss boom 22 is laterally compressed. The flexible moveable battens 30 have integral self actuation mechanisms which are biased in the expanded position.

Figure 9:
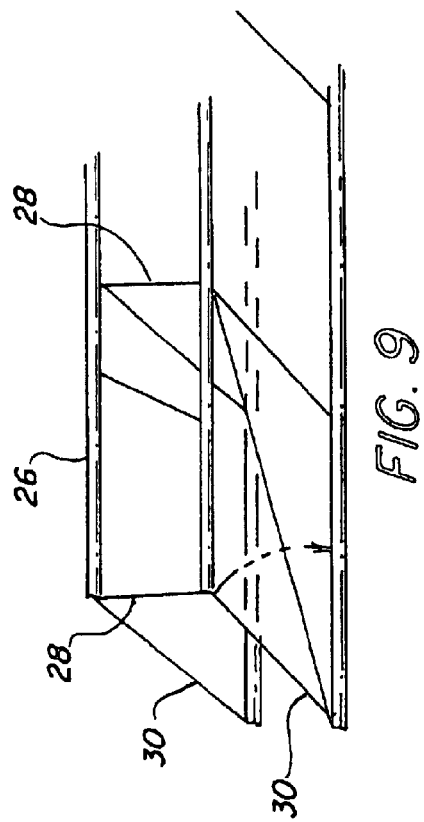
FIG. 9 is a perspective view of a truss boom illustrating the operation of hinged moveable battens.

FIG. 9 illustrates an externally actuated truss boom 22 having hinged moveable battens 30, in accordance with a preferred embodiment of the invention. The moveable battens 30 are hingedly connected to the longerons 26. In preparation for stowage, the arrangement of moveable battens 30 is skewed into a parallelogram until the truss boom 22 is flattened.

The diagonals 32 are preferably constructed of a wire material which is flexible and has a high tensile strength. The diagonals 32 are preferably composed of stainless steel, alpha titanium, Invar wire, or graphite fibers. As shown in FIG. 2, the diagonals form an "X" shaped structure between each adjacent pair of fixed battens 28 and between each adjacent pair of moveable battens 30.

Figure 10:
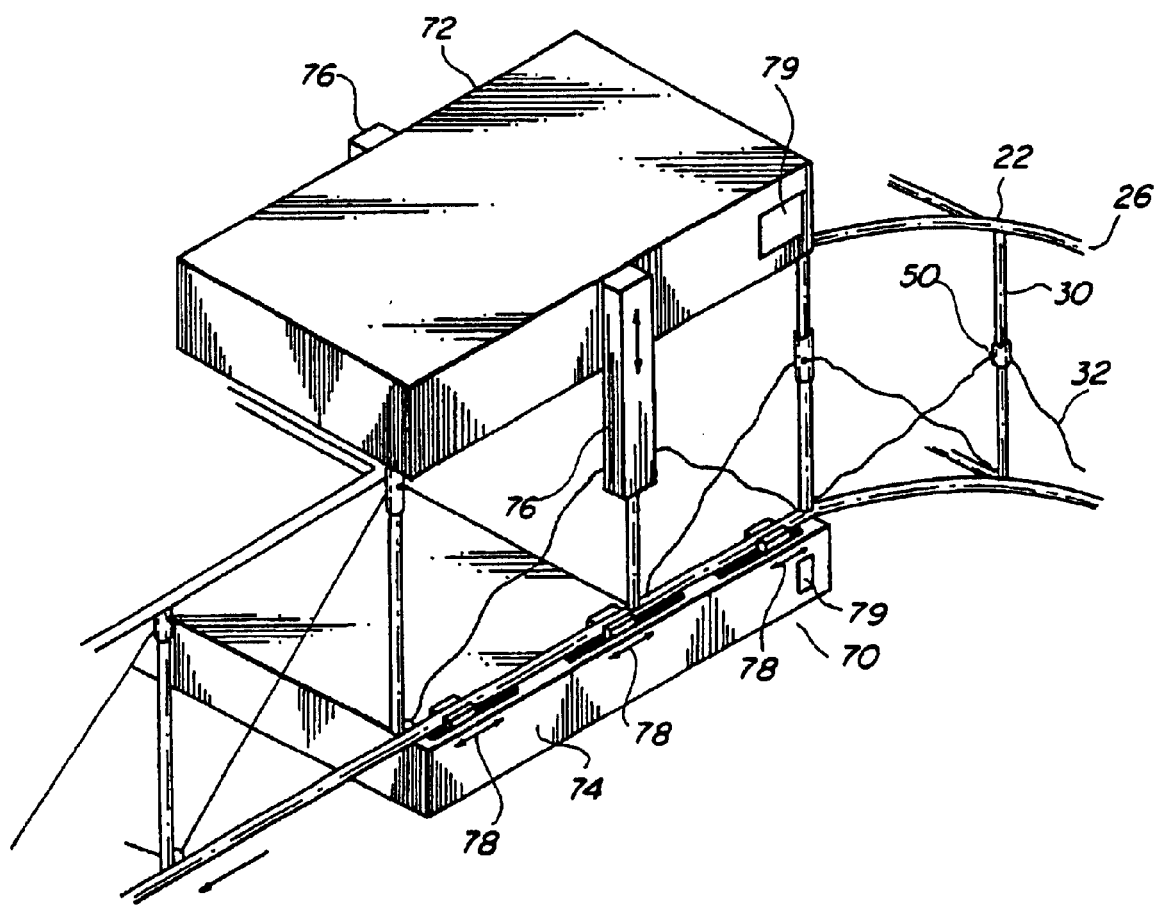
FIG. 10 is a perspective view of an actuating and locking mechanism deploying a mechanically actuated truss boom.

As illustrated in FIGS. 7–9 the diagonals 32 which are located between the fixed battens 28 remain tensioned during both stowage and deployment. However, the diagonals 32 which are located between the moveable battens 30 are relaxed for stowage and tensioned for deployment. When the self actuated truss boom 22 is deployed, the moveable battens 30 tension the diagonals 32. However, when a mechanically actuated truss boom 22 is deployed, the diagonals 32 must be externally tensioned and then locked. FIG. 10 illustrates a mechanically actuated truss boom 22 which utilizes diagonal locks 50 in accordance with a preferred embodiment of the invention. The diagonal locks 50 are lockable sleeves which are attached to the diagonals 32 and slide along the moveable battens 30. During deployment, the diagonal locks 50 tension the diagonals 32 and lock the truss boom 22 in the expanded position.

The operation of the invention will now be described. FIGS. 2–5 illustrate the preparation of the truss boom 22 for stowage. First, the truss boom 10 is preferably compressed laterally from a square cross section, as shown in FIG. 3, to a flattened cross section, as shown in FIG. 4. To minimize the thickness of the flattened truss boom 10, the two longerons 26 of one side of the truss boom 10 lie between the two longerons 26 of the other, as shown in FIG. 4, so that all four longerons 26 are co-planar. In the embodiment shown in FIG. 3, the two longerons 26 on one side of the truss boom 10 are slightly closer to each other than the two longerons of the other side of the truss boom, so the longerons easily fit together when the truss boom is flattened. Next, the flattened truss boom 10 is rolled into a coil 24, as shown in FIG. 5. The coplanarity of the longerons prevents relative motion or strain between longerons 26.

Figure 11:
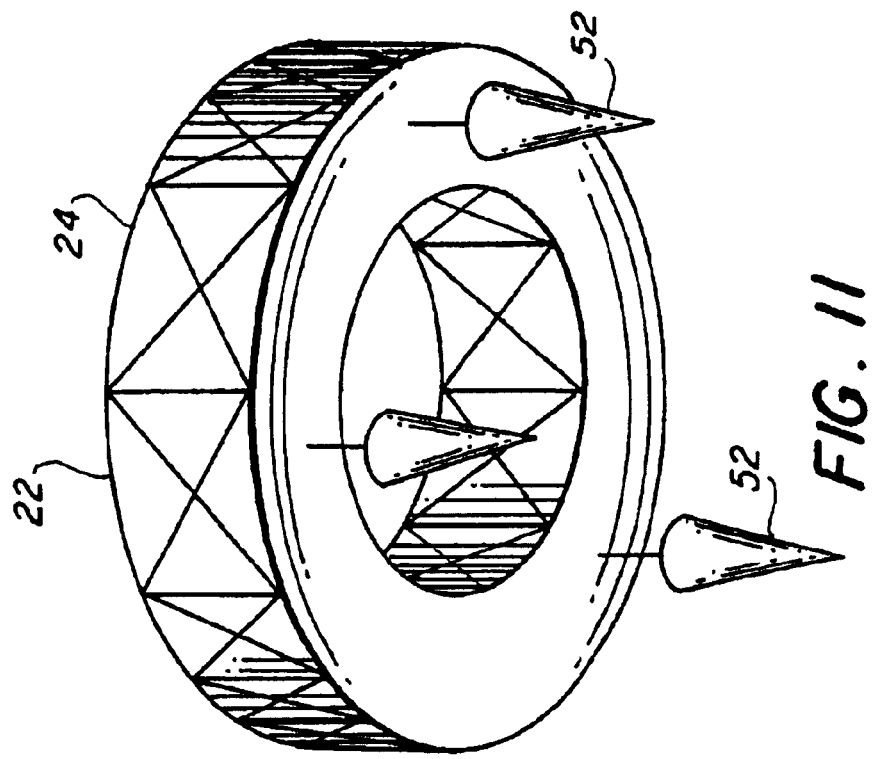
FIG. 11 is a perspective view of instrumentation which is attached to a stowed truss boom.
Figure 12:
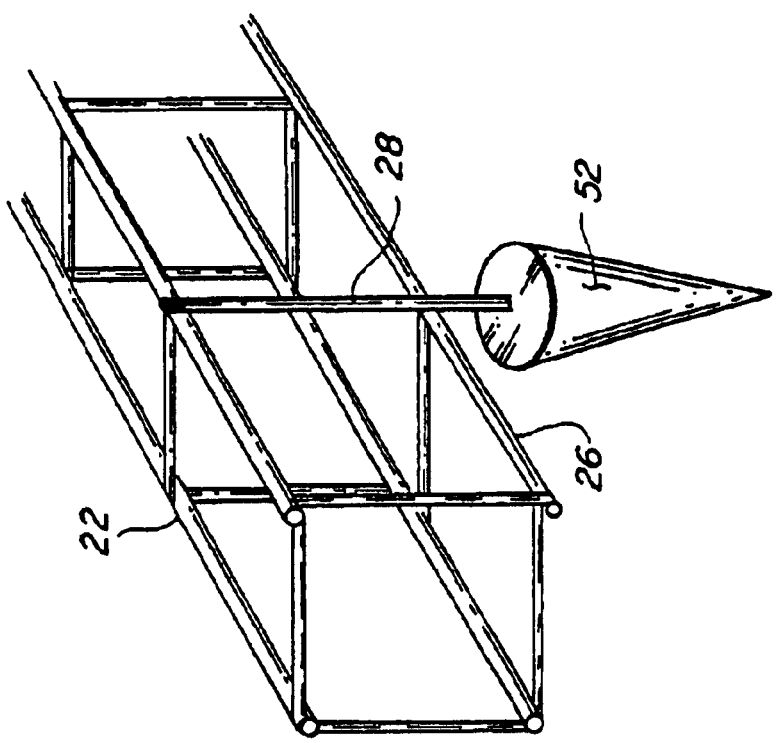
FIG. 12 is a perspective view of instrumentation which is attached to a deployed truss boom.

As shown in FIG. 11, instrumentation 52 may be mounted on fixed battens 28 which extend above and below the stowed truss boom 22. As shown in FIG. 12, instrumentation 52 may be located anywhere along the length of the deployed truss boom 22. Thus the present invention is an improvement over the prior art, which was limited to attaching instrumentation 18 to the leading end of the truss boom 10 and stowing the instrumentation 18 exterior to the storage cannister 20, see FIG. 1. According to another embodiment of the present invention, structural control instrumentation and optical fiber sensors may be installed integrally with the longerons 26, see FIG. 12.

Figures 13, 14:
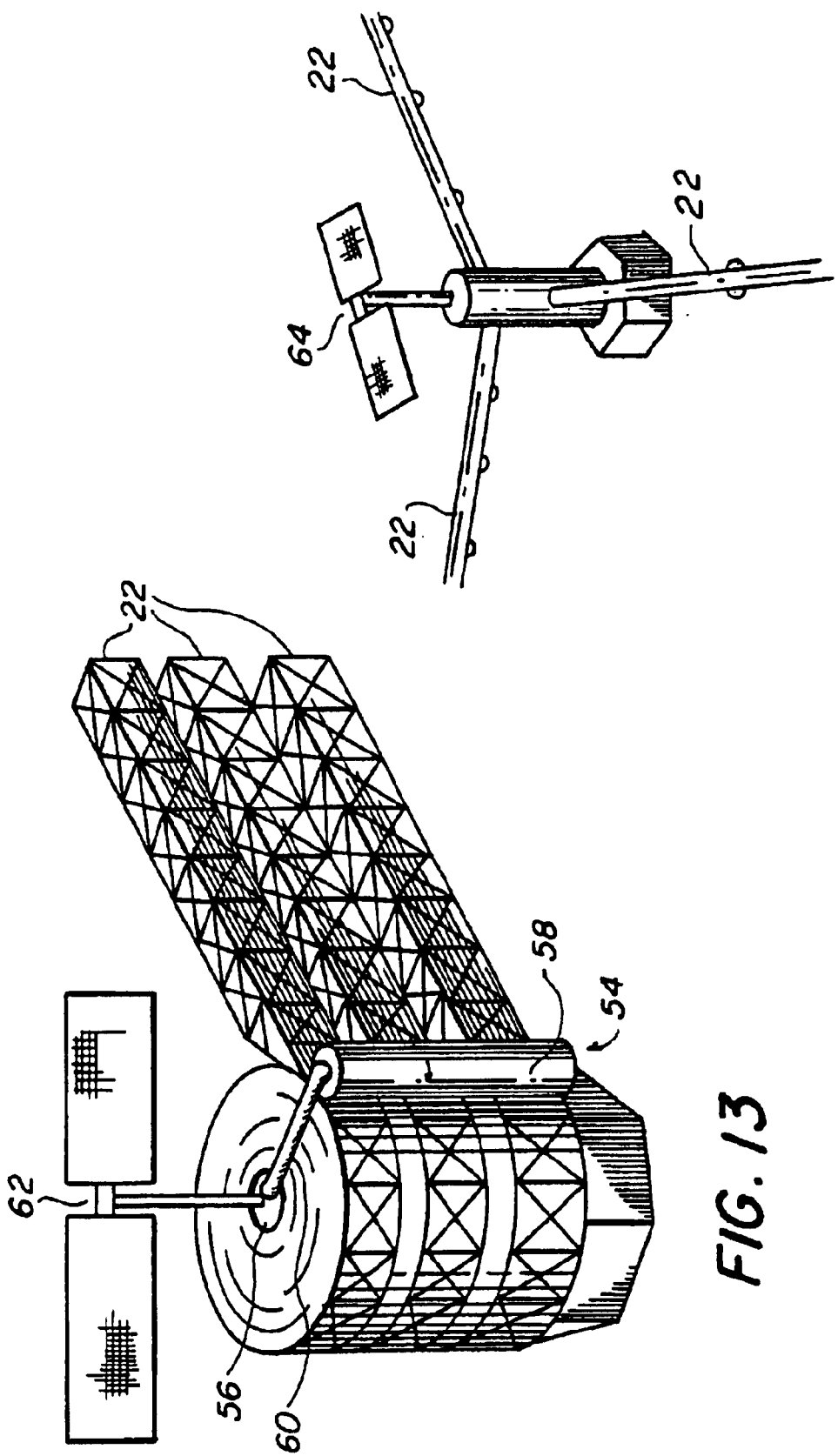
FIG. 13 is a perspective view of a stowed self actuating truss boom and an assembly machine.
FIG. 14 is a perspective view of a deployed self actuating truss boom.

FIGS. 13 and 14 illustrate deployment of a self-actuating truss boom 22 with an assembly machine 54. As shown in FIG. 13, the components of a self actuating assembly machine include a drum 56, a roller 58, and a roller bracket 60 which connects the roller 58 to the drum 56. In the illustrated embodiment, three truss booms 10 are simultaneously deployed from the same spacecraft 62, or satellite, to form an interferometric system 64. However, the assembly machine 54 may be utilized to deploy any desired number of truss booms 22. To deploy the truss boom 22, the roller 58 moves around the spacecraft 62, so that the truss booms 22 are deployed slowly without generating excessive velocities. To deploy the stowed truss boom 22, it is unrolled and actuated from a flattened cross section into an expanded square cross section. Once the truss booms 22 are completely deployed, the roller 58 and roller bracket 60 are detached from the drum 56. FIG. 14 shows the interferometric system 64, after the three truss booms 22 have been deployed.

Figure 15:
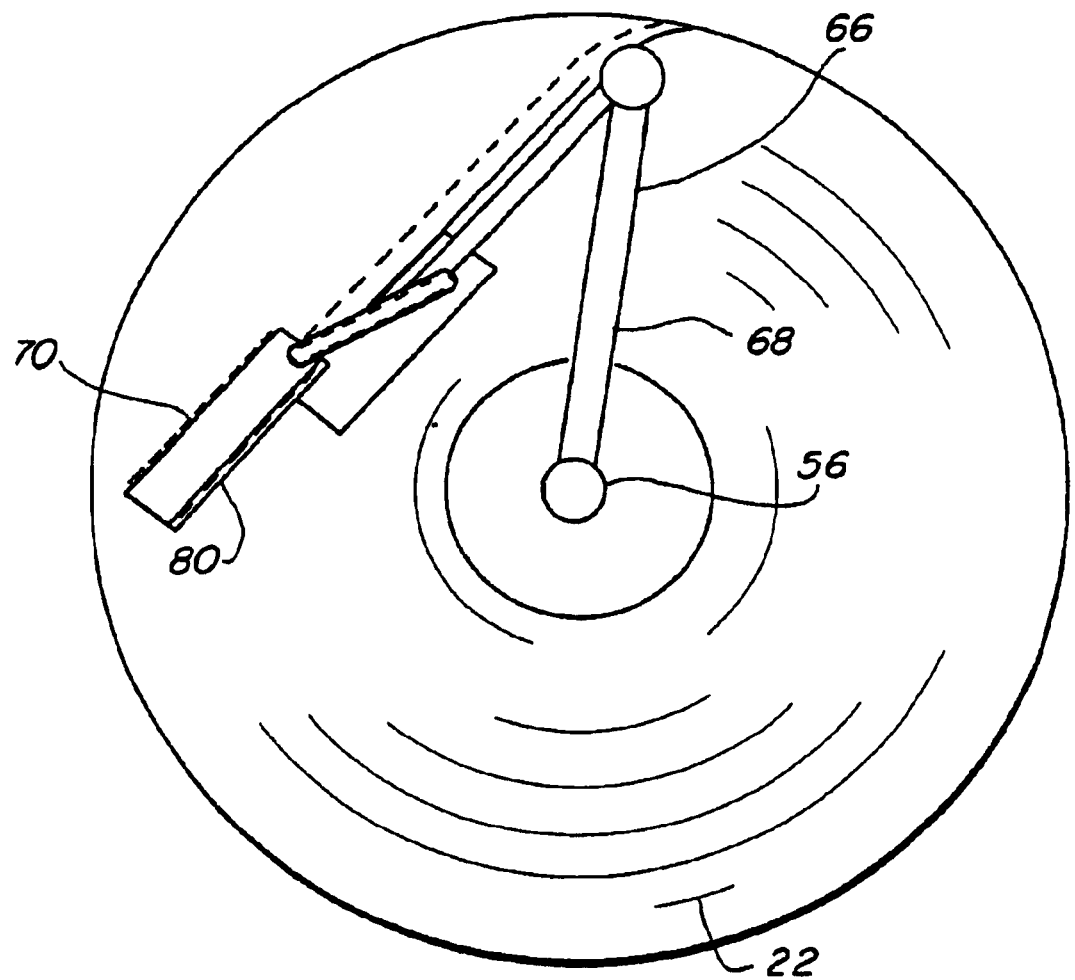
FIG. 15 is a side view of a stowed mechanically actuated truss boom and a stowed mechanical assembly machine.
Figure 16:
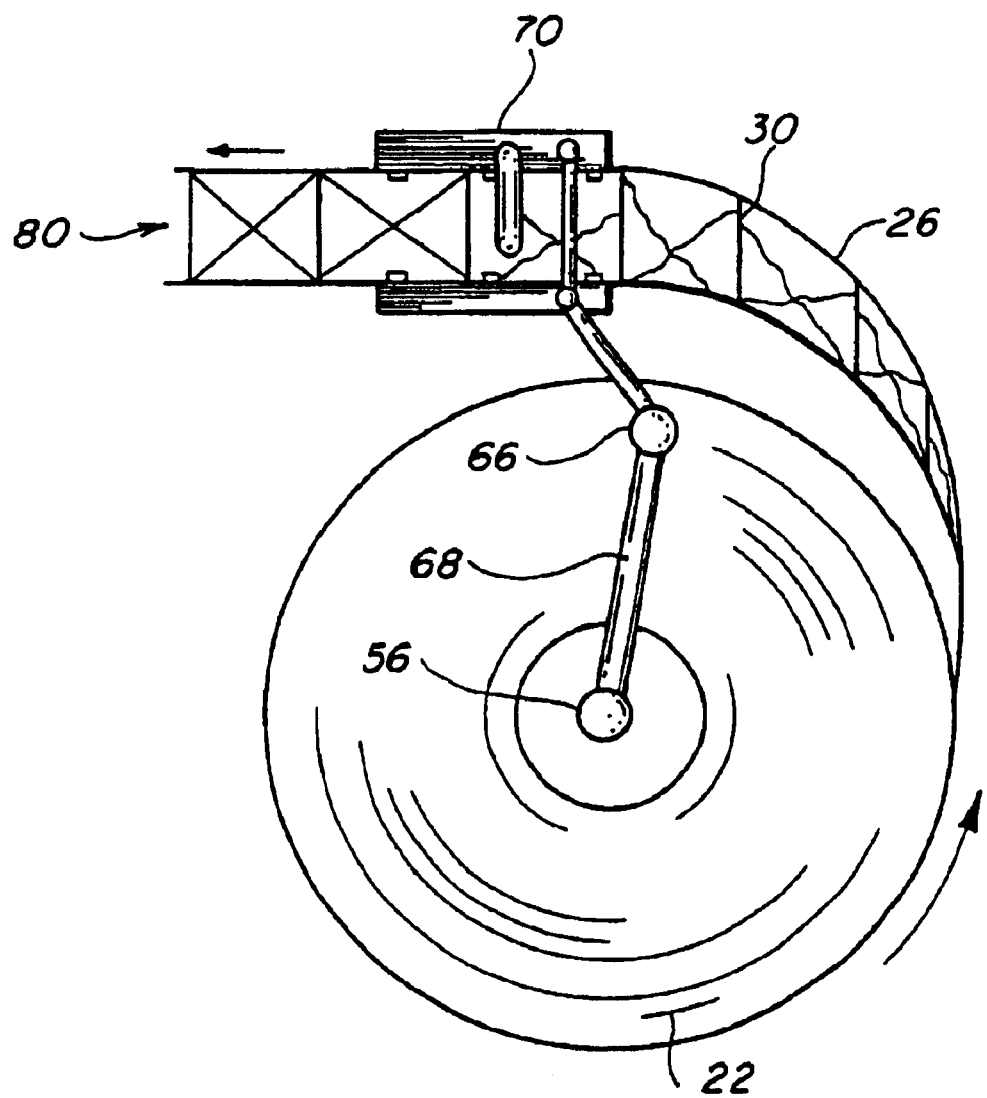
FIG. 16 is a side view of a mechanical assembly machine deploying a stowed mechanically actuated truss boom.

FIGS. 10, 15, and 16 illustrate a mechanical assembly machine 66, and deployment of an externally actuated truss boom 10 from a spacecraft 62, or satellite. The mechanical assembly machine 66 includes a drum 56, a control arm 68, an actuating and locking mechanism 70. The control arm 68 connects the drum 56 to the actuation and locking mechanism 70. As shown in FIG. 10, the actuation and locking mechanism 70 includes upper and lower plates 72 and 74, a pair of opposing diagonal tensioners 76 and 76, and oscillating longeron clamps 78. The diagonal tensioners 76 are movably disposed between the upper and lower plates 72 and 74. In accordance with another preferred embodiment of the invention, the actuating and locking mechanism 70 includes heaters 79 and 79. The heaters are located on the upper and lower plates 72 and 74, and they are utilized to restore a flattened ribbon shaped longeron 38 to its original corrugated cross section 36 during deployment. FIG. 15 illustrates a side view of a mechanical assembly machine 66, which has been stowed for launching. To position the mechanical assembly machine 66 for stowage, the leading edge 80 of the stowed truss boom 22 is held flat by the actuation and locking mechanism 70. The control arm 68 is offset laterally from and retracted radially towards the drum 56, so that a leading edge 80 of the truss boom 22 is off set from and along side of the coil 24.

Referring now to FIG. 16 and to FIG. 10, which illustrates the details of the locking mechanism 70, to commence deploying the stowed truss boom 22, the control arm 68 first moves the actuating and locking mechanism 70 outwards from a space vehicle. Next, the control arm moves inwards to align the center of the actuating and locking mechanism 70 with the center of the drum 56, and the upper and lower plates 72 and 74 are separated to open the leading edge 80 of the truss boom 22 and lock it into its expanded cross section. The mechanical assembly machine 66 unrolls the truss boom 22 by alternately grasping and releasing the longerons with several oscillating longeron clamps 78, which move the truss boom 22 with respect to the mechanical assembly machine 66. Referring again to FIG. 10, half of the longeron clamps 78 on each face of the upper and lower plates release the longerons 26 and then reposition themselves while the other half hold the longerons 26, and this cycle is repeated until the truss boom 22 is completely deployed. Sensors on the mechanical assembly machine 66 locate each batten to prevent the longeron clamps 78 from damaging the battens 28 and 30. The truss boom 22 is preferably unrolled in a continuous motion so that dynamic disturbances are not introduced into the partially deployed truss boom 22.

During deployment, the actuating and locking mechanism 70 of the mechanical assembly machine locks the expanded truss boom 22 into a square cross section as illustrated in FIGS. 16 and 10. As the truss boom 22 is expanded into a square cross section, the moveable battens 30 are straightened until they are perpendicular to the longerons 26. The mechanical assembly machine 66 locks each straightened moveable batten 30 in place by feeding out a length of the truss boom 22 until the diagonal tensioners 76 are aligned with an opposing pair of moveable battens 30. The diagonal tensioners 76 grasp the diagonal locks 50, and they simultaneously tension the wire diagonals 32 and engage the diagonal locks 50 to fix the moveable battens 30 against further rotation with respect to the longerons 26. In accordance with another preferred embodiment of the invention, the actuating and locking mechanism 70 utilizes heaters 79 and 79 to restore a flattened ribbon shaped longeron 38 (shown in FIG. 6) to its original corrugated cross section 36 during deployment.

Figure 18:
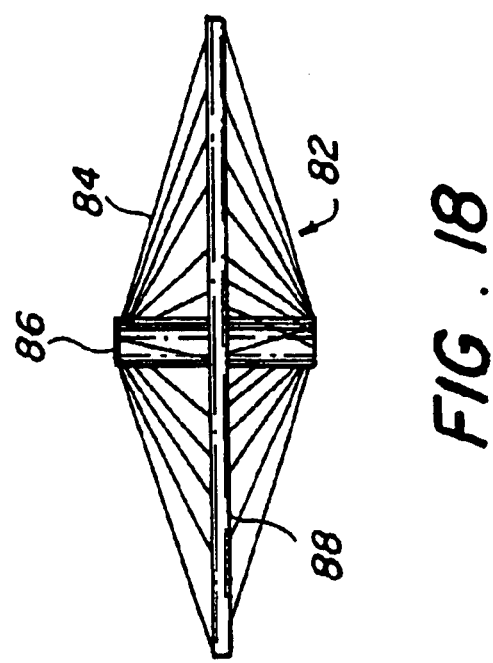
FIG. 18 is a side view of a large circular antenna supported by a ring shaped truss boom.
Figure 17:
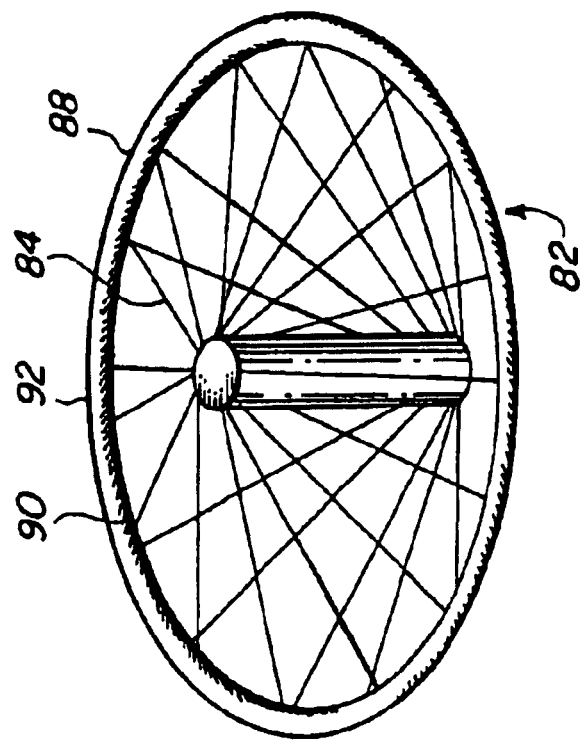
FIG. 17 is a perspective view of a large circular antenna supported by a ring shaped truss boom.

It is also possible to form complex structures, such as a large circular antenna 82 as shown in FIGS. 17 and 18. The structure of the circular antenna 82 is similar to that of a bicycle wheel with structural wires 84 joining a central core 86 to a ring shaped truss boom 88. The ring shaped truss boom 88 has a pair of inner longerons 90 and a pair of outer longerons 92. Active members of the circular antenna 82 may be integrally formed with the structural wires, or the circular antenna 82 may be suspended between the structural wires, to form a parabolic antenna surface.

As shown in FIG. 17, in a ring shaped truss boom 88, the outer circumference is larger than the inner circumference. Therefore the length the outer longerons 92 must exceed that of the inner longerons 90. As shown in FIG. 19, to compensate for the differential length of the longerons 90 and 92, the ring shaped truss boom 88 includes expansion joints 94 which are spaced at predetermined intervals along the outer pair of longerons 92. In accordance with a preferred embodiment of the invention which is illustrated in FIG. 20, the two outer longerons 92 have telescoping expansion joints 96.

Figure 21:
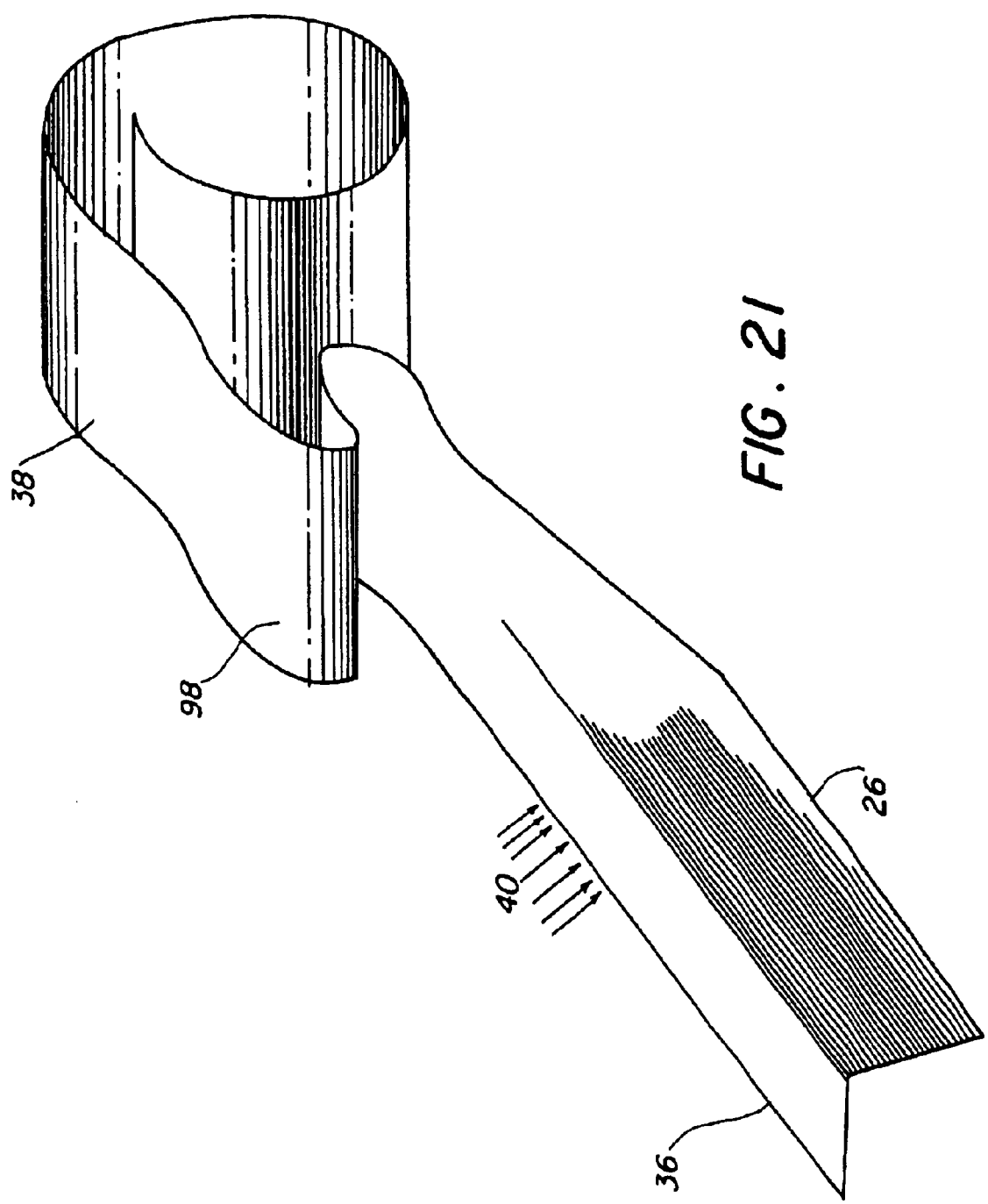
FIG. 21 is a perspective view of a folded expansion joint.

Telescoping expansion joints 96 are utilized along with the solid rod type of longeron. However, the corrugated 36 type of longeron 26 preferably utilizes folded expansion joints 98, as shown in FIG. 21. According to this embodiment of the invention, in preparation for stowage, the outer pair of longerons 92 are formed into a flattened tape which is folded back upon itself to form a folded expansion joint 98. During deployment, the mechanical assembly machine 66 preferably applies heat to the flattened folded expansion joint 98 to cause it to spring back into its original form, a straight corrugated longeron 26.

Figure 22:
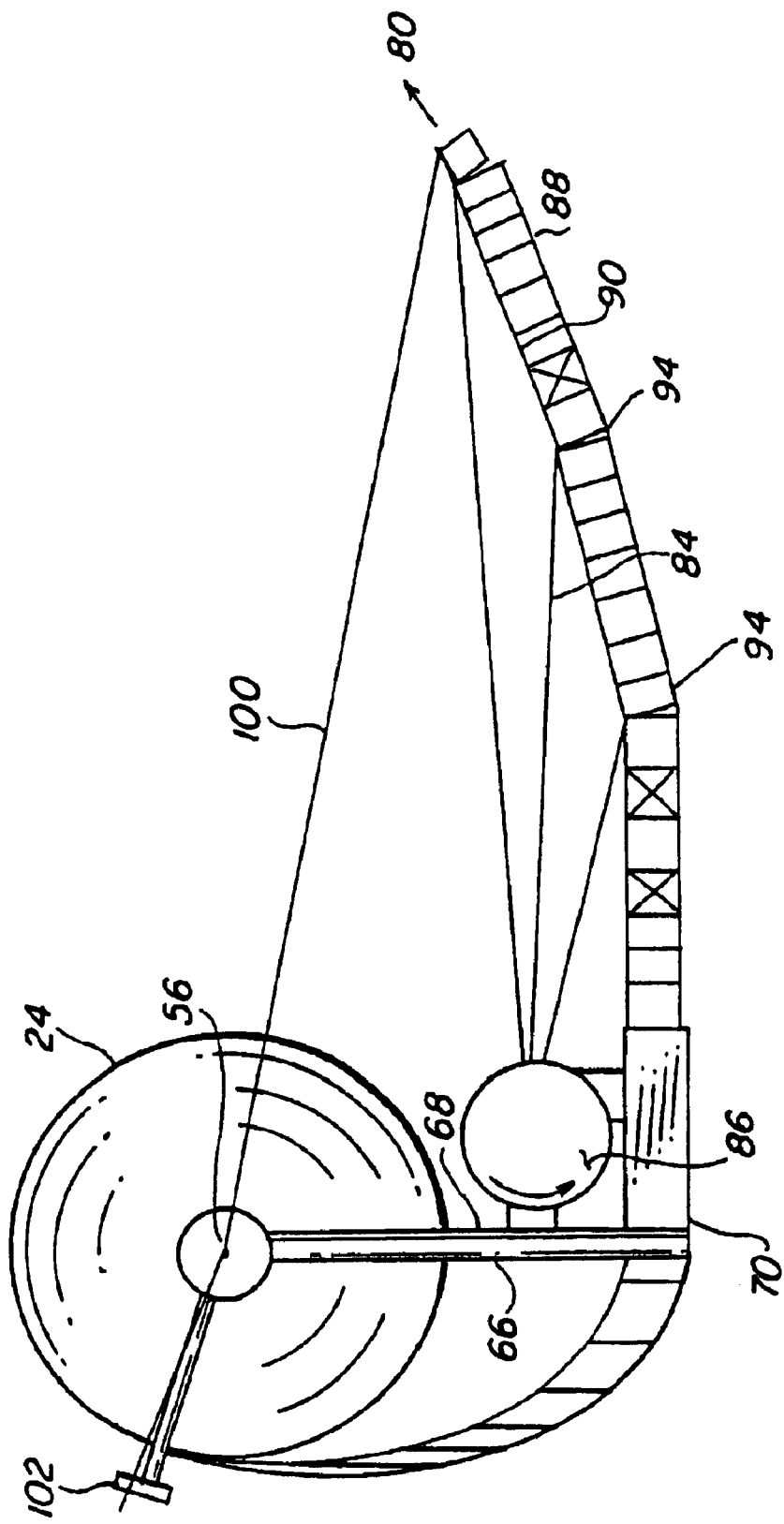
FIG. 22 is a side view of a mechanical assembly machine deploying a ring shaped truss boom.

FIG. 22 is a side view of a mechanical assembly machine 66 deploying a ring shaped truss boom 88. To construct a ring shaped truss boom 88, the mechanical assembly machine 66 utilizes additional components including control cables 100, a receiver arm 102, a central antenna core 86, and structural wires 84 which are stowed within the central antenna core 86. To stow the mechanical assembly machine 66 for launching, the central antenna core 86 is stowed next to and concentric with the truss boom drum 56. In addition, the leading edge 80 of the stowed ring shaped truss boom 88 is held flat by the upper and lower plates 72 and 74. The control arm 68 is offset laterally from and retracted radially towards the drum 56, so that the leading edge 80 is off set from and along side of the stowed ring shaped truss boom 88.

Figure 23:
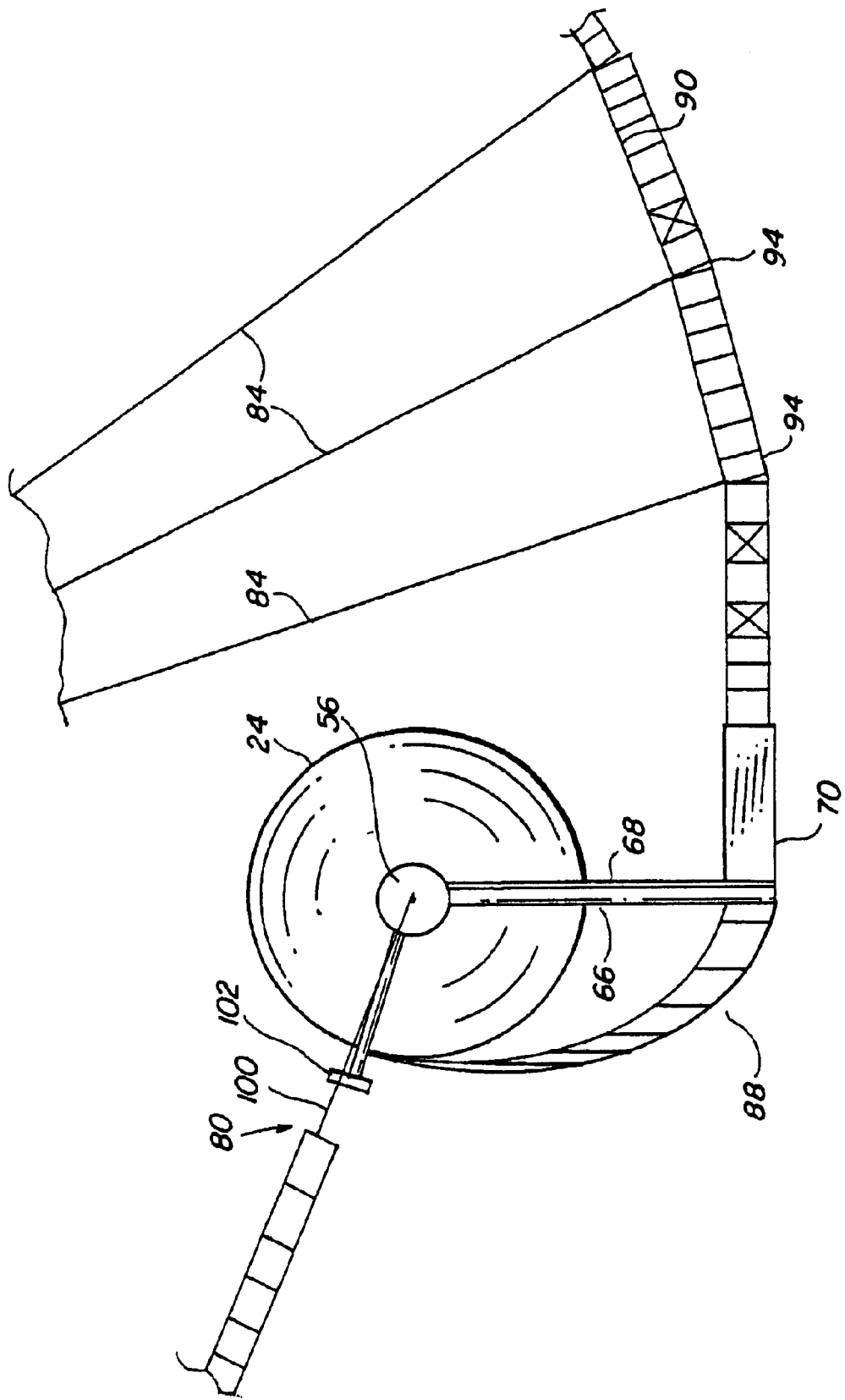
FIG. 23 is a side view of a mechanical assembly machine which has completed deploying a ring shaped truss boom.

To deploy a ring shaped truss boom 88, the stowed ring shaped truss boom 88 and the mechanical assembly machine 66 are jettisoned from the launch vehicle. Once on orbit, the actuating and locking mechanism 70 and the central core 86 are rotated outwards from the stowed ring shaped truss boom 88 and aligned with the center of the stowed ring shaped truss boom 88. Control cables 100 extend from a boom at the center of the drum 56 to control both radial and transverse motion of the leading edge 80. As the ring shaped truss boom 88 is fed out, the assembly machine attaches structural wires 84 to the inner longerons 90 at predetermined intervals. The ring shaped truss boom 88 is composed of straight sections, with expansion joints 94 in the outer longerons at the points where the structural wires 84 attach to the inner longerons 90. In this manner, the ring shaped truss boom 88 has the proper curvature once it is deployed. The mechanical assembly machine 66 continues to extend the ring shaped truss boom 88 until the first structural wire 84 is attached to the ring shaped truss boom 88 extends its full half-kilometer length. The central core 86 is then detached from the mechanical assembly machine 66 and starts to move away, eventually reaching the center of the circle being formed. As illustrated in FIG. 23, the ring shaped truss boom 88 continues to expand around the circle until the control cables 100 draw its leading end into the receiver arm 102, which completes the assembly by rotating the leading edge 80 of the ring shaped truss boom 88 to join a trailing end 104 of the ring shaped truss boom 88 at the mechanical assembly machine 66 where it remains. In accordance with another preferred embodiment of the invention, the actuating and locking mechanism 70 utilizes heaters 79 and 79 (as shown in FIG. 10) to restore a flattened ribbon shaped longeron 38 to its original corrugated cross section 36 during deployment, and to straighten folded expansion joints 98 (as shown in FIG. 21).

Figure 24:
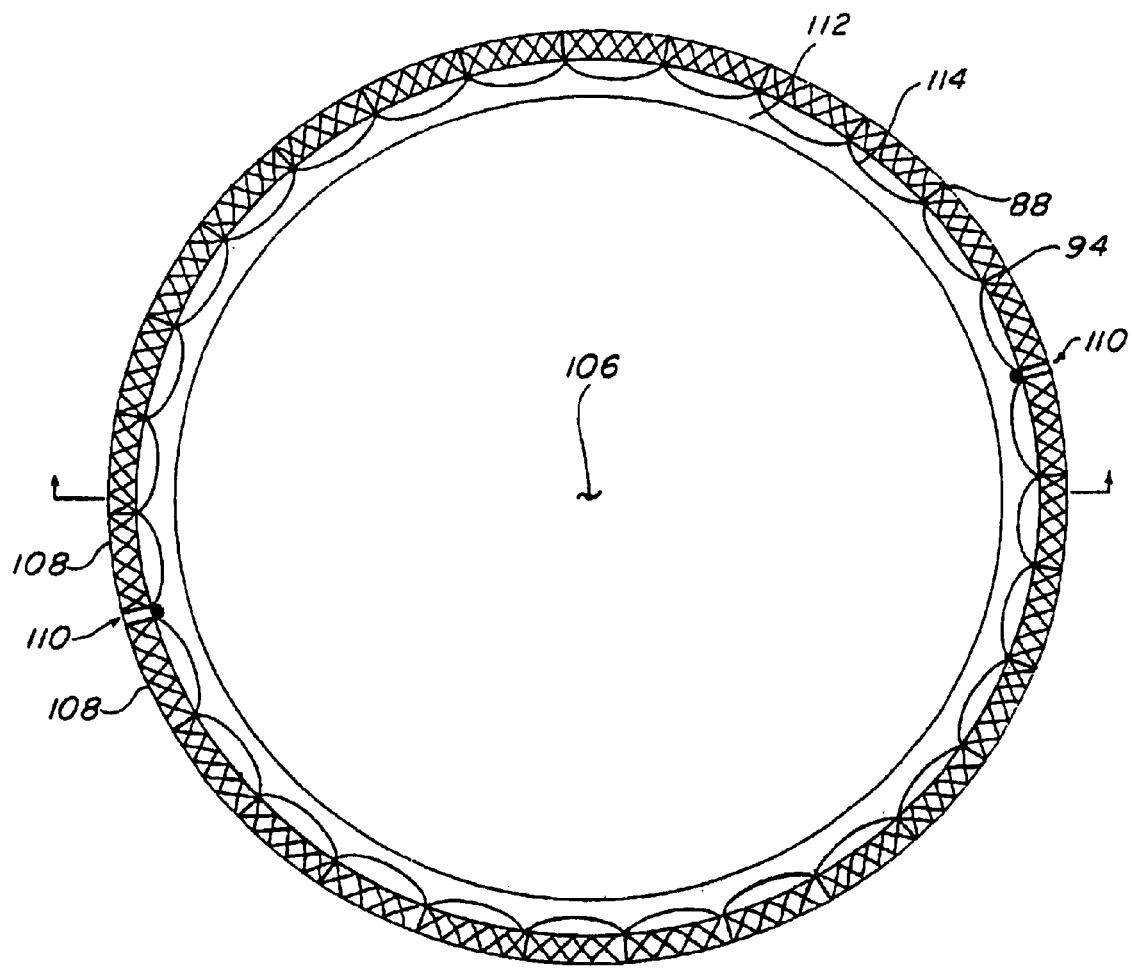
FIG. 24 is a side view of a parabolic antenna showing the truss rim and inflated aperture.
Figure 25:
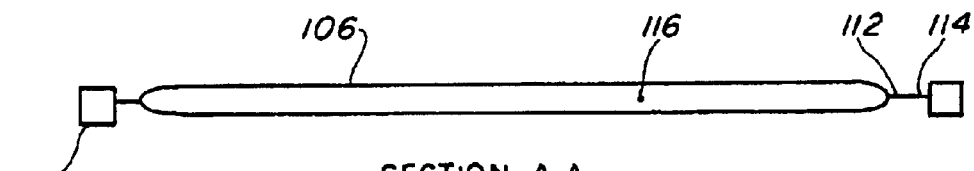
FIG. 25 is a cross section of a parabolic antenna.

As illustrated in FIGS. 24 and 25, another embodiment of the invention utilizes a ring shaped truss boom 88 to support a parabolic antenna 106. The ring shaped truss boom 88 is formed from two semicircular truss boom sections 108 and 108, and their endpoints are connected together by hinges 110 to form a continuous ring. The parabolic antenna 106 has a catenary edge sheet 112 around its perimeter and a catenary bead 114 encircles the outer perimeter of the parabolic antenna 106. The parabolic antenna 106 has an inflatable aperture 116 within its interior. The catenary bead 114 of the parabolic antenna 106 is preferably attached to the inner longerons 90 at each expansion joint 94. Alternatively, attachment may be made to mechanisms mounted on the expansion joint 94 that maintain proper tension and planarity in the antenna.

Figure 26:
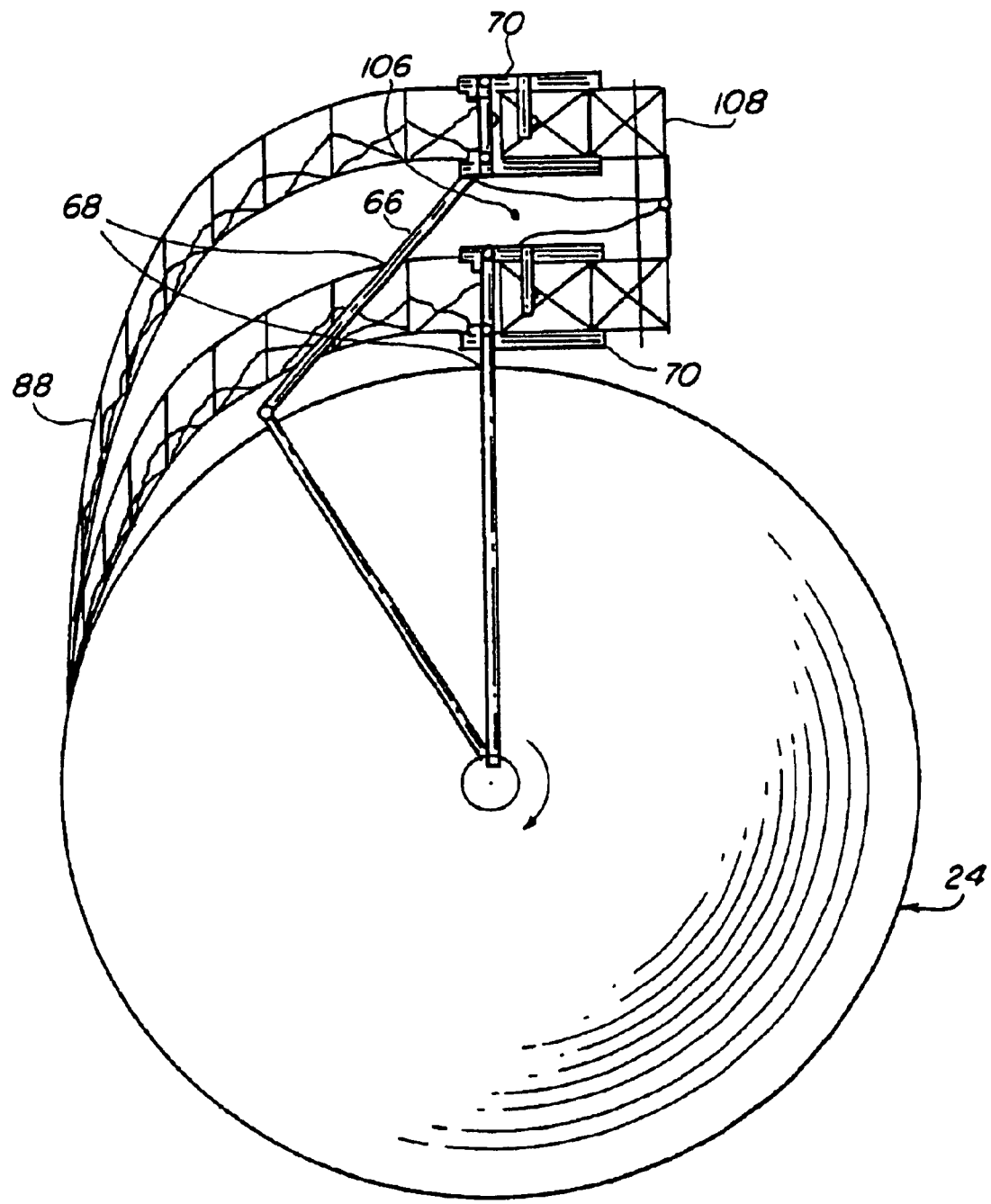
FIG. 26 is a side view of mechanical assembly machine commencing deployment of a parabolic antenna.
Figure 27:
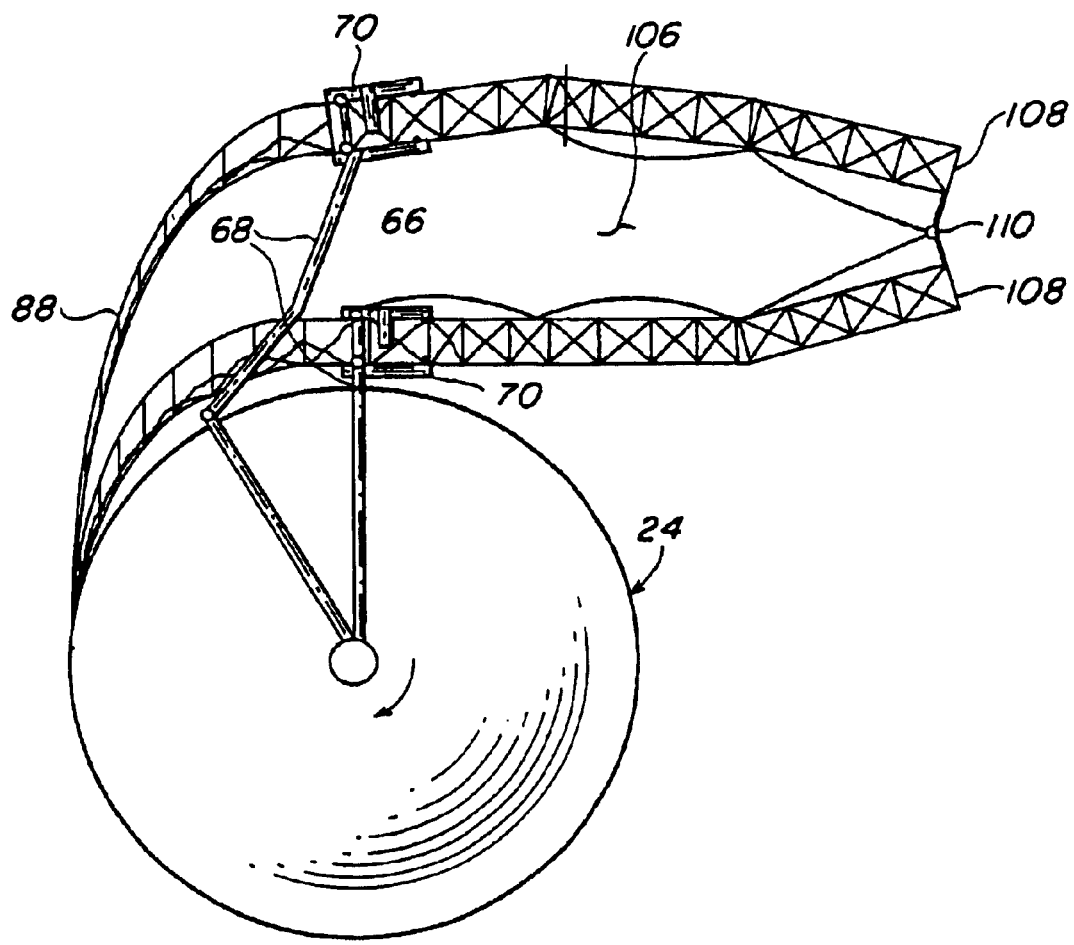
FIG. 27 is a side view of mechanical assembly machine during deployment of a parabolic antenna.
Figure 28:
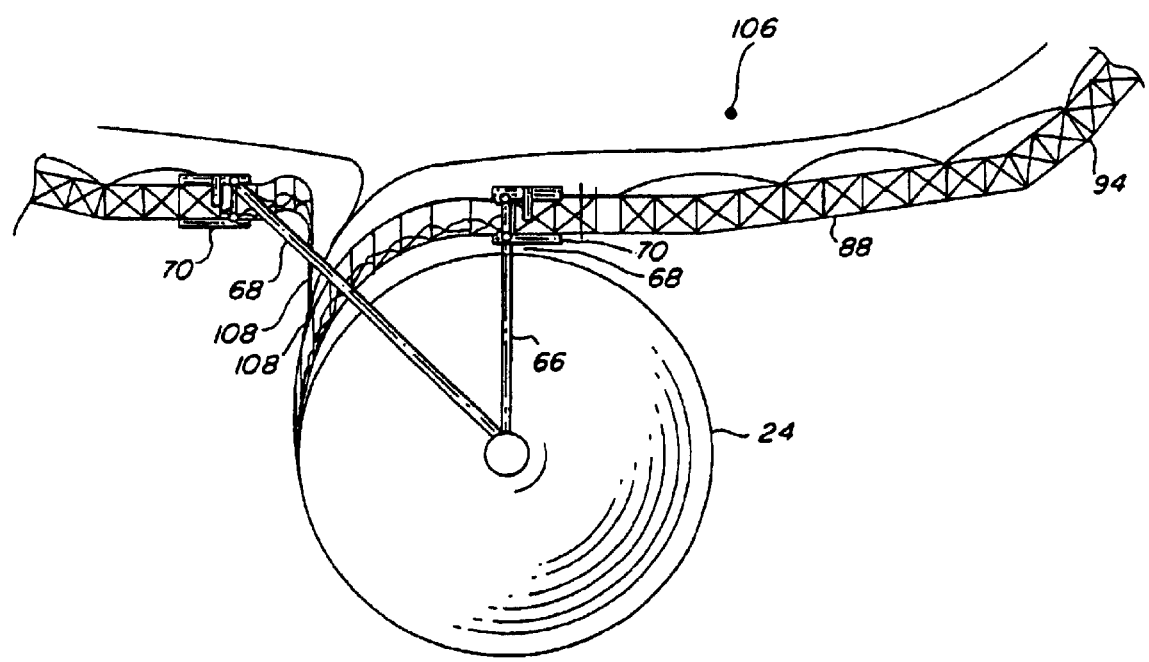
FIG. 28 is a side view of mechanical assembly machine during deployment of a parabolic antenna, after the hinge has been closed.

As shown in FIGS. 26–28, the mechanical assembly machine 66 for deploying the parabolic antenna 106 includes an inner control arm 68 and an outer control arm 68, which are respectively attached to truss boom actuating and locking mechanisms 70 and 70. To prepare the ring shaped truss boom 88 and parabolic antenna 106 for stowage, both of the truss boom sections 108 are flattened, and starting at one of the hinged endpoints, both semi-truss boom sections 108 are rolled around a drum into a coil 24. As the ring shaped truss boom 88 is rolled up, the parabolic antenna 106 is folded up and rolled in a manner which permits it to be stowed adjacent to one side of the coil 24.

As shown in FIG. 26, to deploy the stowed ring shaped truss boom 88 the mechanical assembly machine 66 initially feeds out the opened hinge 110 and commences expanding and locking the ring shaped truss boom 88. As shown in FIGS. 27 and 28, to close the hinge 110 the upper control arm 68 is moved upwards and then away from the stowed ring shaped truss boom 88 in a direction which is opposite to the direction of unrolling. The mechanical assembly machine 66 continues to deploy the truss boom until it reaches the other hinge 110 at the end of the truss boom sections 108 and 108, and closes the hinge 110. As the mechanical assembly machine 66 deploys the ring shaped truss boom 88, the parabolic antenna 106 is unfolded. Upon completion of deployment, the inflatable aperture 116 within the parabolic antenna 106 is inflated.

Truss booms which are configured in accordance with the present invention provide the following advantages. Truss booms are stowed by flattening them and then rolling them into a coil, and this configuration eliminates the need for a storage canister. Without a storage canister, the cross section of the truss boom may be any size required or it may be tapered to have a decreasing cross section from its base to its tip. With prior art cannister stowed truss booms, the length of the canister was a fixed percentage of the length of the truss boom. As a result, the size of the longest straight line dimension in the launch vehicle determined the maximum length of the canister and likewise it determined the maximum length of the truss boom.

In accordance with the present invention, a truss boom which utilizes 4.8 mm (3/16") diameter longerons would have a coil thickness of 9.6 mm (3/8") per revolution of coiled truss boom, allowing a deployed length of 1,000 meters to be stowed in a 3.7 m (12') diameter launch vehicle fairing. As a result, the maximum length of the truss boom is limited only by capacity of the launch vehicle to house the coiled stowed truss boom 22.

The invention allows instrumentation including large antennas to be connected at any location along the length of the truss boom. Prior art canister stowed truss booms were limited in that instrumentation could only be mounted at the leading end of the truss boom, where it would protrude from the storage canister in the stowed position.

The invention allows the truss boom to be made into various shapes in a single assembly, such a large ring shaped truss boom which support a circular antenna or a spoked arrangement of truss booms which form an interferometric system.

After the truss boom has been deployed, the actuating and locking mechanism of the mechanical assembly machine may be utilized as a utility cart to traverse the length of the truss boom, move sensors along the truss boom, or inspect and repair the truss boom.

The invention has been described with reference to certain preferred embodiments thereof. It will be understood, however, that modification and variations are possible within the scope of the appended claims. For example, the truss boom may be formed in any desired cross section, for example circular, oval, triangular, rectangular, or polygonal. Still further, the corrugated longeron the truss boom may be formed in any desired cross section, for example tubular, square, or "U" shaped.

What is claimed is:

1. An elongated truss boom adapted to be flattened and coiled to a stowed configuration comprising:

a plurality of longerons arranged parallel to and equidistant from a longitudinal axis of the truss boom forming a polygonal cross section normal to the longitudinal axis;

a plurality of fixed battens; and a plurality of moveable battens;

wherein the fixed battens and the moveable battens are coupled to the longerons to form a plurality of polygonal frame members which are located in a series of planes normal to the longitudinal axis;

wherein a first and a second longeron of the plurality of longerons are interconnected with at least one of the fixed battens to form a first rigid ladder shaped structure, wherein a third and a fourth longeron of the plurality of longerons are interconnected with at least one other of the fixed battens to form a second rigid ladder shaped structure opposing the first rigid ladder shaped structure, the first rigid ladder shaped structure being moveably connected by movable battens to the second rigid ladder shaped structure; and wherein the first and second longerons are spaced apart from each other less than the third and fourth longerons are spaced apart from each other, so that when the truss boom is flattened the first ladder shaped structure nests between the third and fourth longerons of the second ladder shaped structure and the first, second, third and fourth longerons are substantially coplanar to permit compact stowing.

2. An elongated truss boom as claimed in claim 1, further comprising a plurality of diagonals that interconnect adjacent polygonal frame members.

3. An elongated truss boom as claimed in claim 1, wherein the longerons have a corrugated cross section.

4. An elongated truss boom as claimed in claim 3, wherein the corrugated cross section is "L" shaped.

5. An elongated truss boom as claimed in claim 1, further comprising a self actuation means which biases the moveably coupled battens and the truss boom in an expanded position.

6. An elongated truss boom as claimed in claim 1, further comprising a mechanically actuated locking means which releases the truss boom for stowage and locks the deployed truss boom in an expanded configuration.

7. An elongated truss boom as in claim 1, further including a drum for stowing the flattened truss boom by rolling the flattened truss boom into a coil around the drum.

8. An elongated truss boom as in claim 1, further including instrumentation attached to fixed battens extending above and below the stowed truss boom so that upon elongating the boom the instrumentation is located at predetermined points along the boom.

9. An elongated truss boom as in claim 1, wherein the longerons have a flat ribbon shape when the boom is stowed and a corrugated cross-sectional shape when the boom is deployed.

10. An elongated truss boom as in claim 1, the truss boom being stowed without a storage container.

11. An elongated truss boom as in claim 1, wherein in a stowed configuration of the truss boom, at least one of the plurality of fixed battens extends beyond a width of an outermost pair of the longerons, the truss boom including instrumentation attached to the at least one fixed batten in the stowed configuration and the instrumentation being positioned beyond the width of the outermost pair of the longerons in the stowed configuration.

12. An elongated truss boom adapted to be flattened and coiled to a stowed configuration comprising:

a plurality of longerons arranged parallel to and equidistant from a longitudinal axis of the truss boom forming a polygonal cross section normal to the longitudinal axis;

a plurality of fixed battens; and a plurality of moveable battens;

wherein the fixed battens and the moveable battens are coupled to the longerons to form a plurality of polygonal frame members which are located in a series of planes normal to the longitudinal axis;

wherein a first and a second longeron of the plurality of longerons are interconnected with at least one of the fixed battens to form a first ladder shaped structure, wherein a third and a fourth longeron of the plurality of longerons are interconnected with at least one other of the fixed battens to form a second ladder shaped structure opposing the first ladder shaped structure, the first ladder shaped structure being moveably connected by movable battens to the second ladder shaped structure; and wherein the first and second longerons are spaced apart from each other less than the third and fourth longerons are spaced apart from each other, so that when the truss boom is flattened the first ladder shaped structure nests between the third and fourth longerons of the second ladder shaped structure to permit compact stowing of the truss boom.

* * * * *